United States Patent
Jebbar et al.

(10) Patent No.: US 12,430,232 B2
(45) Date of Patent: Sep. 30, 2025

(54) ARCHITECTURE, METHOD AND SYSTEM FOR LIVE TESTING IN A PRODUCTION ENVIRONMENT

(71) Applicants: Oussama Jebbar, Montreal (CA); Ferhat Khendek, Montreal (CA); Maria Toeroe, Montreal (CA)

(72) Inventors: Oussama Jebbar, Montreal (CA); Ferhat Khendek, Montreal (CA); Maria Toeroe, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 282 days.

(21) Appl. No.: 17/795,639

(22) PCT Filed: Mar. 31, 2021

(86) PCT No.: PCT/IB2021/052699
§ 371 (c)(1),
(2) Date: Jul. 27, 2022

(87) PCT Pub. No.: WO2021/198953
PCT Pub. Date: Oct. 7, 2021

(65) Prior Publication Data
US 2023/0082606 A1   Mar. 16, 2023

Related U.S. Application Data

(60) Provisional application No. 63/002,863, filed on Mar. 31, 2020.

(51) Int. Cl.
*G06F 11/3668* (2025.01)
(52) U.S. Cl.
CPC ...... *G06F 11/3688* (2013.01); *G06F 11/3684* (2013.01)

(58) Field of Classification Search
CPC .............. G06F 11/3688; G06F 11/3684
See application file for complete search history.

(56) References Cited

U.S. PATENT DOCUMENTS

| 2006/0235732 A1* | 10/2006 | Miller | G06Q 10/06313 |
| | | | 705/7.23 |
| 2010/0077257 A1* | 3/2010 | Burchfield | G06F 11/1469 |
| | | | 714/37 |

(Continued)

OTHER PUBLICATIONS

L.M. Hillah et al., Automation and Intelligent scheduling of distributed system functional testing, Published online: Nov. 2, 2016, Springer-Verlag Heidelberg 2016.

(Continued)

*Primary Examiner* — Jigar P Patel
(74) *Attorney, Agent, or Firm* — Ericsson Canada Inc.; Julie Dufort

(57) ABSTRACT

There is provided an architecture, methods and a system for live testing in a production environment. The architecture comprises a platform independent Test Planner for generating a test package in response to receiving an event. Generating a test package comprises selecting test goals, generating a test suite and generating a test plan. The architecture comprises a platform dependent Test Execution Framework (TEF) for executing the test package in an environment serving live traffic. Executing the test package comprises initializing the test plan, starting the test plan and reporting the successful completion of the test plan, reporting the suspension of the test plan and waiting for further instructions, or reporting a failure of the test plan and executing a corresponding contingency plan.

10 Claims, 8 Drawing Sheets

(56) References Cited

U.S. PATENT DOCUMENTS

| | | | | |
|---|---|---|---|---|
| 2010/0287534 | A1* | 11/2010 | Vangala | G06F 11/3612 |
| | | | | 717/124 |
| 2011/0010214 | A1* | 1/2011 | Carruth | G06Q 10/06316 |
| | | | | 705/7.26 |
| 2011/0066486 | A1* | 3/2011 | Bassin | G06F 8/70 |
| | | | | 705/348 |
| 2019/0065345 | A1* | 2/2019 | Patel | G06F 11/3684 |
| 2019/0340113 | A1* | 11/2019 | Earanti | G06F 11/3698 |
| 2022/0129787 | A1* | 4/2022 | Vogeti | G06N 20/00 |

OTHER PUBLICATIONS

M. Ali et al., An Extensible Framework for Online Testing of Choreographed Services, Published by the IEEE Computer Society, 2014 IEEE.
M. Lahami et al., Safe and efficient runtime testing framework applied in dynamic and distributed systems, Elsevier, Science of Computer Programming 122 (2016) 1-28.
OMG Object Management Group, UML Testing Profile 2 (UTP 2), Version 2.0, Dec. 2018.
P. H. Deussen et al., A TTCN-3 Based Online Test and Validation Platform for Internet Services, Proceedings of the Sixth International Symposium on Autonomous Decentralized Systems (ISADS'03) 2003 IEEE.
R. Lee, How to use Yardstick GUI to run a test case or test suite?, last modified on Jun. 15, 2018, Found on OPNFV.
Sintesio et al., Draft—DTR/MTS-103386 v1.1.3 (TR 103 386), ETSI, MTS(16)067019, Jan. 22, 2016.
TenSt, verfio/fortio-operator, project under the folder Verfio, found on Github, last commit on Mar. 18, 2019.
ISR and Written Opinion dated Jun. 25, 2021 from corresponding application PCT/IB2021/052699.

* cited by examiner

ARCHITECTURE, METHOD AND SYSTEM FOR LIVE TESTING IN A PRODUCTION ENVIRONMENT

PRIORITY STATEMENT UNDER 35 U.S.C. S.119(E) & 37 C.F.R. S.1.78

This non-provisional patent application claims priority based upon the prior U.S. provisional patent application entitled "ARCHITECTURE, METHOD AND SYSTEM FOR LIVE TESTING IN A PRODUCTION ENVIRONMENT", application No. 63/002,863, filed Mar. 31, 2020, in the name of Jebbar et al.

TECHNICAL FIELD

The present disclosure relates to testing in live cloud systems.

BACKGROUND

Today, software testing is typically performed in lab environments attempting to re-create the environment in which the software is going to be deployed. With the size and complexity of cloud-based architectures, which are becoming the typical production environments, it becomes extremely difficult or unfeasible to re-create the environment in a lab context. This results in a shift towards the production environment for testing activities.

Testing in the production environment today is usually limited to monitoring of the system to detect issues. In certain cases, this is also combined with submitting a challenge to the system and again monitoring the reaction. However, when the services provided by the production environment need to be highly available and/or are mission critical, the testing activities in the production environment need to consider service level agreements constraints, which poses a number of challenges.

SUMMARY

There is provided an architecture for live testing, comprising a platform independent Test Planner for generating a test package in response to receiving an event; and a platform dependent Test Execution Framework (TEF) for executing the test package in an environment serving live traffic.

There is provided a method for generating a test package for live testing, comprising selecting test goals corresponding to a received event; generating a test suite comprising test cases and test design techniques selected to achieve the test goals; and generating a test plan comprising partially ordered Test Suite Item runs (TSIs), wherein each TSI combines a test configuration with at least one test suite item.

There is provided a method for executing the test package on live system serving live traffic for live testing, comprising initializing a test plan; starting the test plan, the test plan starting Test Suite Item runs (TSIs) of a test suite according to a provided ordering, the test plan being able to invoke one or more TSIs, for sequential or parallel execution; upon successful completion of all TSIs tearing down the test plan and reporting the successful completion of the test plan; upon suspension of a TSI reporting the suspension of the test suite item run and waiting for further instructions; and upon failure of a TSI with an ERROR verdict, reporting a failure of the test plan and executing a corresponding contingency plan.

There is provided a system in which live testing is executed comprising processing circuits and a memory, the memory containing instructions executable by the processing circuits whereby the system is operative to generate a test package in response to receiving an event; and execute the test package in an environment serving live traffic.

There is provided a non-transitory computer readable media having stored thereon instructions for live testing in a production environment, the instructions comprising any of the steps described herein.

The architecture, methods, system and non-transitory computer readable media provided herein present improvements to the way architecture, methods, system and non-transitory computer readable media discussed in the previous section operate.

DETAILED DESCRIPTION

Figure 1:
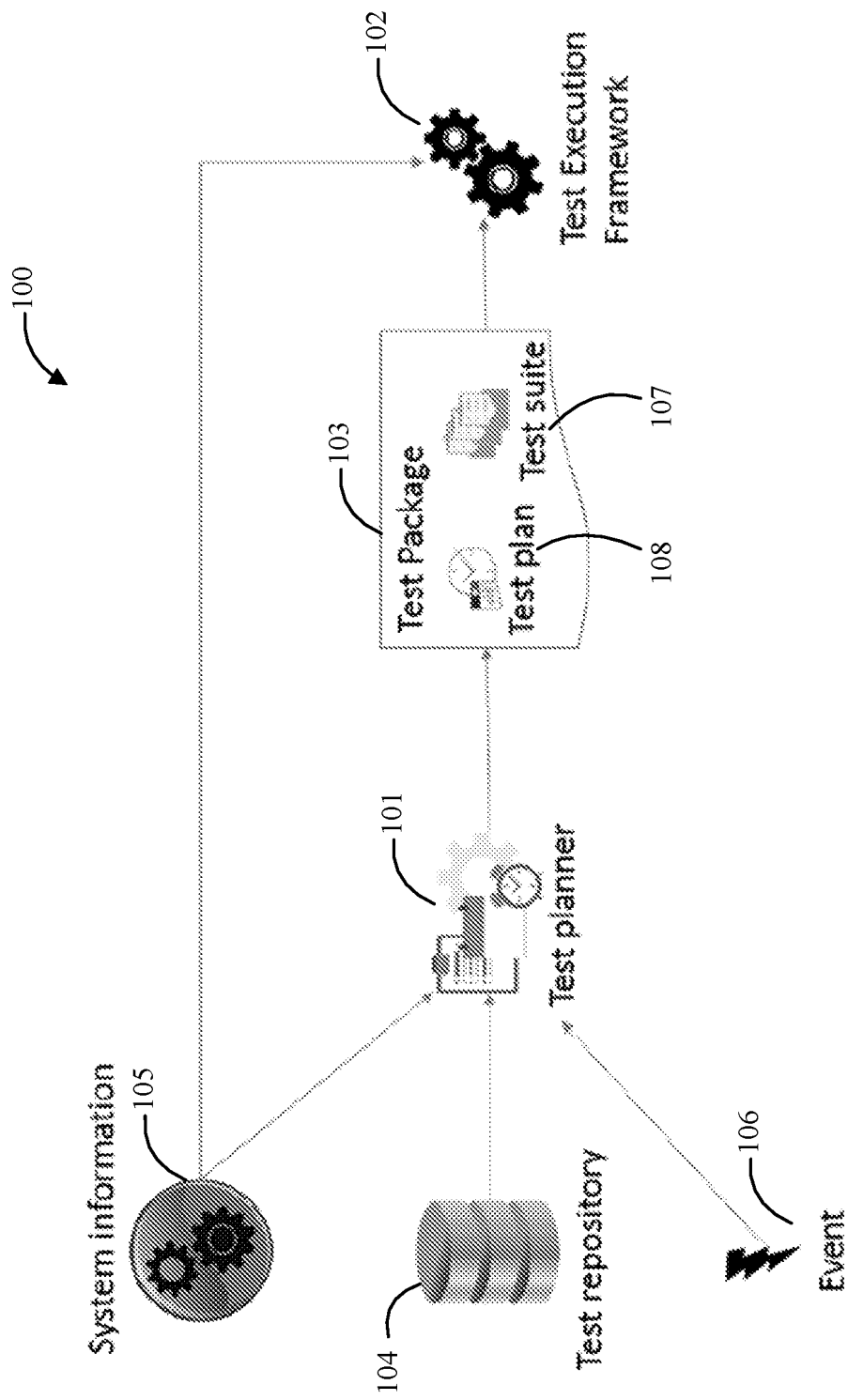
FIG. 1 is a schematic illustration of an architecture for live testing in a production environment.

Various features will now be described with reference to the drawings to fully convey the scope of the disclosure to those skilled in the art.

Sequences of actions or functions may be used within this disclosure. It should be recognized that some functions or actions, in some contexts, could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed; these are generally illustrated with dashed lines.

Live testing can be performed in a production environment without causing intolerable disturbance to the system's usage. To do so, test activities have to be orchestrated properly to avoid interferences with normal usage traffic. Conducting live testing activities manually is generally error prone because of the size and the complexity of the system as well as the required complex orchestration of different tasks. Furthermore, it is impossible to react to failures and contain them in due time without automation.

Live testing is the activity of testing a system in the production environment without disturbing its usage. Many activities such as fault prediction, regression testing after a live update, composing web services, etc., are expected to rely on live testing in the future. Live testing can be either deployment time testing or service time testing. Deployment time testing is performed when a system is deployed but it is not yet serving users. Service time testing is performed while the system is serving its users.

Live testing requires a high level of automation. The test preparation phase does not only consist of deploying a test configuration, but also on setting up test isolation countermeasures to reduce potential disturbances. In addition, executing a crashing error revealing test case may lead to failures that need to be contained, and recovered from, in a timely manner. Testing related activities such as test planning, test execution and orchestration, test completion, etc., require automation for live testing to be conducted successfully.

Automating live testing for systems such as cloud systems presents several challenges. The software involved in building such systems, as well as the test cases used to validate the systems often come from different sources; therefore, one cannot expect to interact with or test all parts of the system using the same runtime environment (the same technology), or the same methodology (passive, active, metamorphic, etc.). Moreover, the diversity of the sources of software and test cases implies that different configuration management platforms are often used for test preparation and/or software reconfiguration. The dynamicity of cloud systems is yet another challenge for automation of live testing of cloud systems as the frequently changing state of the system may jeopardize the applicability of test cases at certain points of time due, for instance, to unmet preconditions. Online testing methods are well suited to deal with such challenges but remain unsupported by the commonly used test runtime environments. In addition, existing test runtime environments are concerned only by test execution without considering test preparation and completion and do not support multiple test case description languages. Thus, there is a need for a solution to tackle test automation of cloud systems.

An architecture is therefore proposed that relies on a modeling framework to decouple the specification of testing activities from the platforms needed to conduct these testing activities. The architecture is composed of two main building blocks, a Test Planner and a Test Execution Framework, each of which is responsible for a subset of testing activities. To deal with the challenges related to the diversity of platforms encountered in cloud systems, UML Testing Profile (UTP) is used, to provide a platform independent representation of all the artifacts involved in the information flow of the proposed architecture.

Relevant elements in the artifacts involved in the architecture are mapped to UTP provided concepts. An execution semantics that the Test Execution Framework can associate with each model element that represents an entity involved in tests execution and orchestration is also proposed. The execution semantics is not only useful for automatic orchestration of testing activities, but also for tracking the progress of these activities and reacting appropriately.

There are tasks that an architecture for test orchestration should be able to perform: 1) observation, i.e. ability to collect information; 2) stimulation, i.e. ability to stimulate the system; and 3) reaction, i.e. an event, such as a detected error, should trigger a reaction at the level of the system under test (SUT) as much as it does at the level of the test system itself. In other words, adaptation at the level of the SUT should lead to adaptation at the level of the test system too.

Test architectures in the art can be classified into passive tests or active tests orchestration architectures. Another classification of test architectures can be established based on what triggers the testing activities; from this perspective, one can distinguish between interactive architectures and event driven architectures. Interactive architectures are the ones in which testing activities are triggered by human intervention (e.g. system administrator). Such architectures launch testing activities when an administrator submits a request through a graphical user interface (GUI) or a command line interface (CLI). Event driven architectures rely on events, such as a lapse of a timer, to trigger testing activities. The most commonly considered event is a system reconfiguration as it requires regression testing to evaluate the new state of the system. Reconfigurations can be simple adaptations such as a change in the binding of web services, or additions or removals of one or more components. Other types of events comprise timers that establish periodic checks, call or lookup of a component, detection of an error or fault that needs to be localized, etc.

These test architectures and solutions are used to orchestrate various types of tests, such as:
  pre-deployment testing of infrastructures' performance, capacity, availability, and the infrastructure's ability to properly run lifecycle operations on Virtual Network Functions (VNFs) and Network Services;
  load tests on microservices in a Kubernetes managed environment;
  resiliency testing through fault injection in the production environment; and
  resiliency testing through injecting faults at network level and not code level thus allowing for applicability across different technologies.

These approaches have the potential to be adapted to safe use in a production environment, but remain limited to specific test types (load, performance, resiliency, etc.), and/or to specific test items (infrastructure, specific software, etc.).

From this a number of challenges that need to be addressed to automate live testing can be identify and can be summarized as follows:
  Challenge #1: Test cases come from different sources (software vendor, test teams, third party). They may be written in different languages and require different runtime environments for execution. On the other hand, converting all available test cases to one programming or modeling language is unpractical (at the moment as it has to be done manually), and sometimes even unfeasible (for test cases whose logic is inaccessible for the system owner).
  Challenge #2: Test cases coming from different vendors typically imply also that the test configurations for these test cases are deployed differently. Therefore, setting up the test configurations may require different environments or tools depending on the test case.
  Challenge #3: Test cases may be of different nature. Passive tests such as monitoring, active tests, or metamorphic tests all differ in the way their configurations are deployed, how they should be executed, and how/when their verdicts are generated/fetched.
  Challenge #4: In production testing the test cases are performed in the same production environment which serves the user traffic. Therefore, there is a need to deal with non-determinism and the dynamicity of the runtime state. Timely handling of events is essential. Existing tools of test case execution (such as the ETSI TTCN Test Architecture) assume that only the test cases are executed in the SUT. However, one may need to use an online testing method to test some properties of the system. Online testing is a viable solution to deal with non-determinism and the dynamicity of the runtime state of modern systems such as clouds. Therefore, a proper solution for automation of live tests needs to support these systems.

Today these challenges are not properly addressed and system maintainers who encounter these challenges end up either orchestrating the tests manually or creating ad hoc scripts for a few test sessions at best. Manual methods of test orchestration are not reusable, error prone, and rarely deal with all the various failures that may take place during the testing activities.

An architecture for the automation of live testing of cloud systems is proposed for tackling the challenges identified in relation with this automation.

The first step for dealing with these challenges is to decouple the representation of the system and the artifacts involved in the testing activities from any platform. The second step is to specify how this representation is processed and used to achieve the goals, i.e. automate testing activities in production.

Testing activities such as planning, preparation, execution, completion, etc., need to be automated for live testing to be properly conducted. Unlike test planning, other activities such as preparation and execution depend heavily on the platform of the SUT. In other words, a good solution for test execution for microservice based systems, for instance, may not be good enough for ETSI Network Function Virtualization (NFV) based systems. However, a good solution for test planning is reusable regardless of the platform of the SUT provided that the SUT can be modeled at the right level of abstraction.

Therefore, when designing a solution to automate live tests, one has to take into consideration to what extent each activity may depend on the target platform on which the solution would be applied to be considered a good solution to automate. Taking this into consideration, activities that heavily depend on the target platform are grouped into one building block; and activities that may be reused across several contexts are grouped into another building block.

FIG. 1 illustrates an architecture 100 to automate testing activities in a production environment. The architecture is composed of the Test Planner 101 (reusable building block) and the Test Execution Framework 102 (target platform dependent block). The Test Planner 101 is responsible of generating the test package 103. The test package 103 is generated as a response to an event taking into consideration the test cases in the test repository 104 and the current state of the system (system information 105). The test package 103 is then fed to the Test Execution Framework 102 which executes it on a live system while maintaining the disruption level within a tolerable range.

System information 105 is an artifact that represents the knowledge about the SUT that is required to properly conduct testing activities. It includes system configuration, runtime state, available software packages and their properties, and data collected or used by other management frameworks (availability management, scalability management, virtualization management, etc.).

The test repository 104 stores test cases and test design methods along with the test goals they achieve. Test goals may be of various granularity ranging from the exercise of a path in a software (same granularity as test requirement in UTP); to system wide acceptance testing (same granularity as test objective in UTP). Other test case related information such as history of execution times, fault exposure rates, etc., are also stored in the test repository. Similarly, the test repository has information about test design techniques such as their required inputs and whether they are online or offline test design techniques. The test cases, test design techniques (both online and offline), and the test goals in the repository come from developers, software vendors, or the system administrator. The extra information is collected after each test session as the test case execution environment allows it. This extra information is then used to update the test repository accordingly.

An event 106 is what triggers a test session. Events are configured at the level of an instance of this architecture. Events can be created by the system maintainer or by a third-party software to launch an on-demand test session. Events created by third party software are of several types including events triggered by other management frameworks (for some specific types of regression testing, or to assist in root cause analysis, for instance); as well as events created by some system components to ensure they are using services from the right components.

A test package 103 consists of a test suite 107 and a test plan 108. The test suite 107 includes test suite items which are test cases and/or test design techniques that were selected from the test repository 104 to respond to the received event(s) 106. The test plan 108 provides the road map of the test execution and specifies a set of partially ordered Test Suite Item runs (TSIs), each TSI is an application of one or more test suite items under a given test configuration. This approach allows for grouping according to different criteria. For example, it allows grouping together TSIs if setting up a test configuration is costly and/or disruptive, and there are more than one test items that can be applied. In this case one needs to setup this configuration only once during a test session and run all the test suite items that apply before tearing the test session down. In other cases, TSIs applicable to the same test configuration may be grouped separately based on the criticality of the services they may impact. Information on how the tests should be executed such as test configurations, test preparations e.g. isolation countermeasures, contingency plans to fix/contain crashing errors detected during the tests, etc., are also included in the test plan.

The Test Planner 101 is responsible of generating the test package 103 in response to a received event 106. Taking into consideration the received event, the Test Planner 101 starts by selecting the test goals which respond/correspond to that event. After test goal selection, the Test Planner proceeds with the selection of test cases or test design techniques that can achieve the selected test goals. The selected test suite items will compose the test suite 107 in the test package. The Test Planner relies on the information in the test repository 104, especially the mapping between test cases/test design techniques to the test goals they achieve, to select these test cases and test design techniques. To complete the test package, the Test Planner 101 generates a test plan 108. This test plan is generated taking into consideration the extra information available about each selected test case as well as the knowledge available about the system (system information 105). This information helps to decide which isolation method and contingency plan to use for each test case or set of test cases. As a result, test plan generation is a complicated process that involves making some decisions that, if made inappropriately, may lead to unnecessary or even intolerable disruptions in the system.

The generated test package 103 is then given to the Test Execution Framework 102 for execution. After the execution, the Test Planner updates, when applicable, the test repository using the information collected about each executed test case.

The Test Execution Framework (TEF) 102 takes a test package 103 as input and executes it on a live system. Executing a test suite 107 consists of running the test suite items according to the test plan 108. The test plan is composed of partially ordered TSIs (test suite item runs), where each TSI combines a test configuration with at least one test suite item. Such grouping allows flexibility in scheduling TSIs according to their test configurations, to enable a less intrusive test execution. In order to automate testing activities in production, the TEF implements different execution semantics for each one of the aforementioned concepts.

The Test Planner's 101 responsibilities are mainly related to test planning and test design activities. This clearly reflects on the main artifacts it is responsible of generating, i.e. the test package 103 which is composed of a test suite 107 and a test plan 108. A proposed approach for the automation of test design activities will be described.

The Test Planner 101 generates the test package 103 in response to an event 106. As a result, test design activities are conducted according to the received event. The following list enumerates some event types:

Periodic event: some parts of the system need to be checked periodically. In fact, those parts, even though unchanged, may be impacted by a change in their environment. A periodic test helps ensuring that some subsystems are always functioning correctly in the production environment. This type of events is specified as a set of test goals and a period of how frequently the tests should be achieved.

Change in the system: a reconfiguration is usually a reason to perform regression tests. Therefore, a change in the system is considered an event that can trigger a live test session. The Test Planner can be made aware of a change either: 1) by registering to the notifications of the configuration manager; or 2) by being invoked directly by the configuration manager after a given reconfiguration.

New test goal: addition of a new test goal to the repository should trigger a test session to achieve the new test goal. In fact, adding a new test goal may be accompanied by addition of new test case(s), the execution of which may reveal errors that were not detected previously. It is also possible that the new test goal is achieved using a combination of test cases that were not used together before, which may reveal new errors as well.

Test request: a test request include the cases not covered by the previous types of events. Therefore, a test request may be submitted by an administrator or a third-party software. This test request can be of one of the following types:

Used as an aggregation of periodic events: the administrator may want to run some system checks together for a period of time. In this case, a test request can be used to aggregate the periodic events associated with these system checks.

A set of test goals to achieve: at any point in time, an administrator or a third party software may initiate a test session by submitting this type of test requests. It is composed of a set of test goals to be achieved, which are selected from the repository. This type of test requests is mainly practical for test goals that are achieved using test design techniques and not test cases as there is another type of requests that can be used to invoke specific test cases.

A set of fault-revealing test goals: when a fault revealing test goal is achieved, errors are detected if the fault(s) to be revealed is/are present. The main purpose of a test request consisting of such goals is to localize the faults behind these errors. Hence this type of test requests is mainly used to trigger system diagnostics. An administrator or a third-party software may give the Test Planner 101 a set of fault-revealing test goals and the Test Planner can generate a test package 103 that can help localize the faults behind the errors that manifest when one or more of these test goals are achieved.

A set of test cases: a set of test cases to be executed may be requested by the administrator or a third-party software.

The test suite 107 is one of the components of the test package 103 that the Test Planner 101 generates to respond to an event 106. Therefore, taking into consideration the received event, the Test Planner follows different strategies to select the test suite items that will compose the test suite. A method for this purpose can follow the following rules:

If the received event 106 is a periodic event happening for the first time, the Test Planner 101 selects test cases and test design techniques that are able to achieve the test goals specified by this event. This is a straightforward process as the mapping between the test cases/test design techniques and the test goals they achieve is already stored in the test repository.

If the received event 106 is a periodic event and no reconfiguration or test goal addition happened since the last instance of this event, the Test Planner 101 should reuse the same test suite from the last time an instance of this event occurred. This is done for the reason that since the system has not undergone any change, this means that the same test cases/test design techniques are applicable and will be chosen for this instance of the event as for its previous instance. This is like a heuristic that is used to save some time in this activity as querying the test repository may be time consuming.

If the received event 106 is a periodic event, and there was a reconfiguration or test goals were added since the last instance of this event; this event is treated as if it is happening for the first time. In fact, a change in the system or in the content of the test repository may require a different set of test suite items to achieve the same test goals as previous instances (before the change). Therefore, a reselection of test cases and test design techniques is deemed necessary in this case.

If the received event 106 is an addition of new test goals, then the Test Planner 101 should select the test suite items that achieves the newly added test goals. The addition of a test goal leads to existing or new test cases/test design techniques be mapped to it. As a result, one needs to check if achieving this new test goal may reveal any errors that were not detected previously. Using the mapping information from the test repository, one can deduce the set of test cases/test design techniques needed to achieve this new test goal.

If the received event 106 is a reconfiguration, the Test Planner 101 should use an approach for regression test case selection/generation to select the test cases. Several approaches may be used to deal with this kind of event. For instance, a test design technique that is stored in the repository may simply perform an impact analysis and come up with a set of regression test goals from the repository to be achieved. In this case the Test Planner will select test cases and test design techniques that achieve the selected test goals to compose the test suite. Another approach to deal with this event is by having a default regression test case selection/generation technique that will be invoked whenever a reconfiguration takes place.

If the event is a test request:
  If the test request is an aggregation of periodic events, it is handled the same way as a periodic event.
  If the test request consists of a set of test goals to be checked, the Test Planner 101 selects the set of test cases and test design techniques to be used to achieve the requested test goals. This is done based on the information from the repository that maps each test goal to the test cases/test design techniques that achieve the test goal.
  If the test request consists of a set of fault-revealing test goals, the Test Planner 101 first identifies other test goals that are related to the requested test goals and which (if achieved) can help localize the faults. After identifying those goals, the Test Planner selects test cases and test design techniques that are able to achieve the selected test goals. The identification of the related test goals can be done by invoking a default fault localization technique.
  If the test request consists of a set of requested test cases, the test suite will be composed of the requested test cases.

The following addresses decoupling the representation of the system and the artifacts involved in testing activities from the target platform.

Modeling techniques, especially Unified Modeling Language (UML), are commonly used for platform independent modeling of systems. Therefore, UML may be used to provide a platform independent representation of targeted systems and artifacts. Such a representation is needed to model the artifacts and to have an exchange format for these artifacts (between the building blocks of the architecture), and also to track the progress of the testing activities and accordingly invoke appropriate behaviors. UML Testing Profile (UTP) is chosen herein to model all the artifacts in play in the architecture, including the test plan. A person skilled in the art will recognize that other choices could alternatively be made e.g. in the future when other modeling languages become available. The choice of UTP was based on the following rationales:

UTP covers a wide range of testing activities and it is aligned with industry testing standards.
  UTP is a UML profile, and therefore some of the inherited concepts from UML allow for flexibility, extendibility, and interoperability with existing tools.
  The flexibility offered by UTP to model verdicts and arbitration specifications allows capturing of runtime errors. As a result, using UTP will not limit the capability of the architecture to detect failures and react to them.
  UTP allows the reuse of all concepts used in UML to model behaviors, including the use of UML's CombinedFragment. Therefore, it supports a wide range of patterns of scheduling such as sequential, parallel, alternative, etc., which allows to deal with Challenge #3.

UTP offers plenty of opportunities to automate the orchestration of testing activities in production. However, some minor modifications may be needed to cover all bases. These minor modifications can be summarized as follows:

UTP as-is does not allow associating an ArbitrationSpecification with a ProcedureInvocation element. This constraint needs to be relaxed to enable to arbitrate actions taken in the setup phase (for setting up isolation countermeasures), teardown actions, or the execution of test generation actions when invoking a test design technique.
  UTP offers concepts to model test logs. However, these test logs are associated only with test cases and test procedures. In online testing methods, one needs to log the test design activities too. Therefore, two types of logs may need to be associated with a TestDesignTechnique element:
    TestDesignTechniqueLog: to log test design activities. The structure of this log is specified by a TestDesignTechniqueLogStructure element associated with the TestDesignTechnique.
    TestCaseLog: if the online testing method generates new test cases, the TestCaseLog is also associated with the TestDesignTechnique element. The structure of the logs of the generated test cases is specified by the TestCaseLogStructure element.

This extension helps dealing with the representation and modeling aspect of Challenge #4. The remaining aspect of this challenge related to the behavior is dealt with at the level of TEF.

The mapping between the concepts proposed herein, and the ones defined in UTP is shown in Table I.

TABLE I

Mapping the artifacts in the abstract architecture to UTP concepts

| Abstract Architecture concepts | UTP concepts |
| --- | --- |
| Test repository | Set of pairs (TestContext, aggregate of test logs) |
| Test case as in the repository | TestProcedure |
| Test design technique as in the repository | TestDesignTechnique |
| Test suite item in the test plan | ProcedureInvocation (e.g. TestProcedure, or TestDesignTechnique invocation) in the main phase of a TestCase |
| TSI | TestCase |
| Test package | TestContext |
| Test suite | TestSet |

TABLE I-continued

Mapping the artifacts in the abstract architecture to UTP concepts

| Abstract Architecture concepts | UTP concepts |
| --- | --- |
| Test plan | TestExecutionSchedule |
| Periodic event | Triplet (TestLevel, TestType, TestDesignInput) + time data |
| Test request: test goals to be achieved | Subset of TestRequirements or TestObjectives that are in the test repository |
| Test request: fault revealing test goals | A set of TestRequirements or TestObjectives (not necessarily in the test repository) |
| Test related metadata | TestLogs |
| Test related metadata specification | TestLogStructure |
| Test results | Verdicts (Pass, Fail, Inconclusive) |
| Failure detection during test execution | Verdicts (Error, customized verdicts) |
| Test preparation including the setting up of isolation countermeasure | TestCase setup procedure invocation |
| Test completion including the cleanup of isolation countermeasure | TestCase teardown procedure invocation |
| Test goal | TestRequirement or TestObjective |

This mapping enables expressing test plans as TestExecutionSchedules that run UTP TestCases. UTP TestCases consist of one or more test cases provided by the vendor or the developer (along with a test configuration) enhanced with some isolation countermeasures that need to be set up before the execution of the test case (which is a UTP TestProcedure), and that need to be torn down at the end. UTP TestProcedures may be modeled using UML concepts. UTP also offers the possibility of specifying TestProcedures using other languages as OpaqueBehavior (a concept inherited from UML). Therefore, this mapping is used to properly deal with Challenge #1.

Test goals that are associated with test cases in the repository are modeled as UTP TestRequirement. Test goals that are associated with test design techniques are modeled as UTP TestObjective. The main difference between the two is that a TestRequirement is a contribution of a test case towards achieving a TestObjective. However, a TestObjective is defined as the stopping criterion of testing activities. Both TestObjective and TestRequirement can be specified informally using natural language, or formally using a machine understandable language such as ETSI TPlan. Expressing TestRequirements and TestObjectives using formal languages may open the door for further processing of these model elements and make them more suitable for other purposes of live testing such as diagnostics.

Test configurations in UTP include modeling the configuration of the test component as well as the configuration of the test item (system or component under test). Two patterns are proposed in UTP specification to model these configurations, one of them being modeling these configurations as constraints. Although UML has a language for constraints specifications, similar to behaviors, it also allows the usage of other languages. Test configurations may be specified in various languages such as ansible playbook language, puppet DSL, chef DSL, etc.; as a result, one may use this feature of UML to specify test configurations as constraints expressed in languages that deployment management engines can process. Therefore, such use of UTP is useful for dealing with Challenge #2.

The mapping also allows to detect failures during execution, as the verdict type provided by UTP allows it. To address this, UTP provided verdict "error" can be used as a concept to model failures of actions for which it is not clear whether the problem during the execution is caused by a problem in the test component or the test item.

Moreover, UTP allows the creation of user customized verdicts. Since the implementation of a test component may be part of an implementation of this architecture, the implementer can draw up a list of possible problems that can occur to the test component (test component's failure modes), create their customized verdicts, and then the implementation of this environment can decide which actions to take to recover the failed test component based on the customized verdict that was issued. This approach can also be used with test components of some test environment about which the system maintainer has enough knowledge.

An approach to address the challenges concerning the behavior associated by the building blocks of the architecture to each element of the artifacts representation is discussed next, mainly focusing on the TEF, and how it processes the artifacts generated by the Test Planner according to the execution semantics proposed herein. This execution semantics is used for:

The automatic orchestration and control of testing activities in production.

Tracking the progress of testing activities by monitoring the state of each runtime object involved in the orchestration of testing activities. The TEF, through this tracking, is then able to orchestrate the testing activities and becomes aware of any mishaps that may take place during this orchestration.

The first test plan model element which is associated with an execution semantics is the TestExecutionSchedule, which is also a runtime object that is used by the TEF to track and control a test session. It is composed of a set of partially ordered TSIs. A TSI is modelled in a test plan as a UTP TestCase, its setup and teardown phases are composed of ProcedureInvocation elements (to setup/teardown the test configuration); and its main phase is composed of a set of invocations of TestProcedures and/or TestDesignTechniques.

Figure 2:
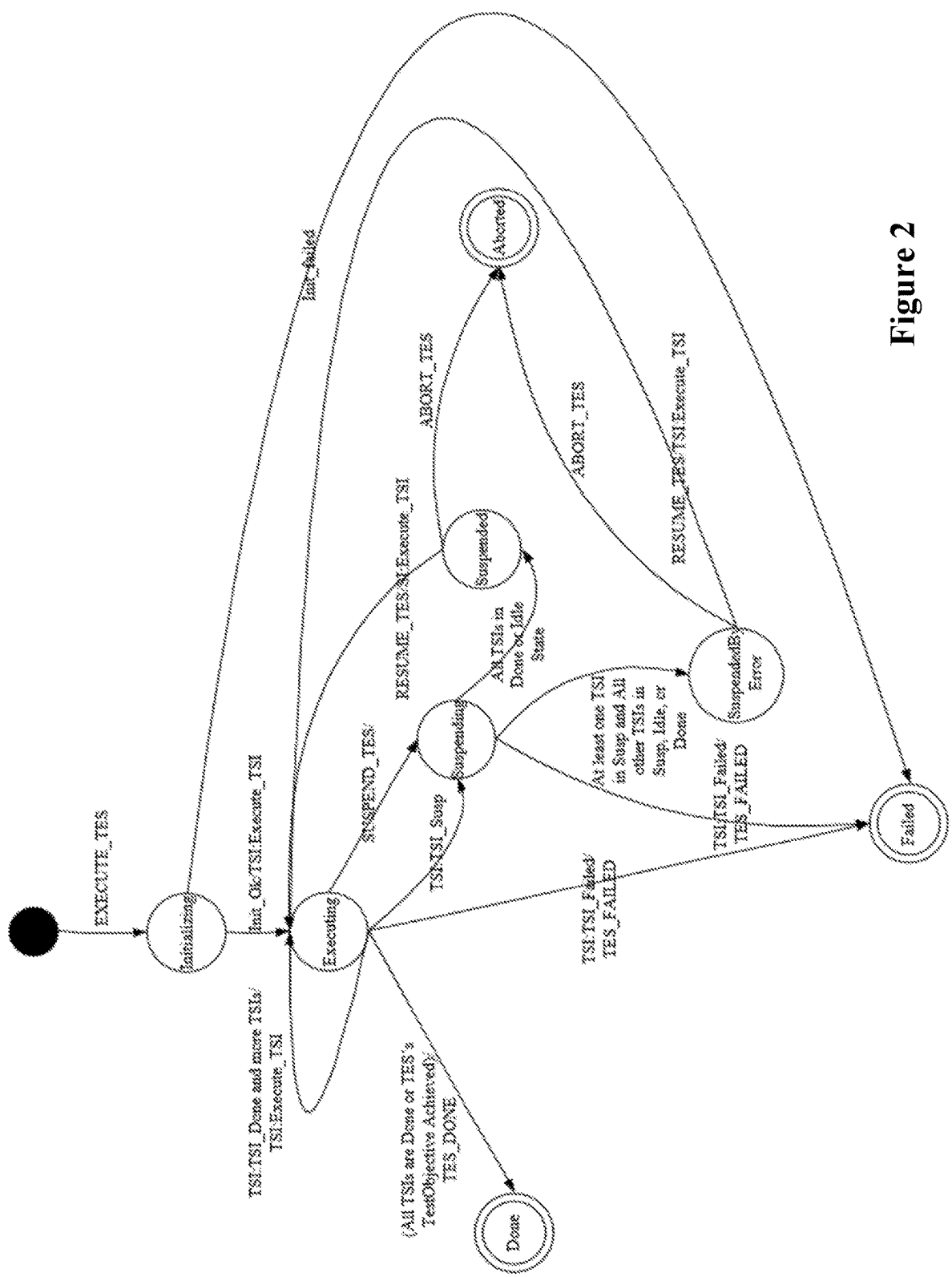
FIG. 2 is a schematic illustration of an execution semantics of a TestExecutionSchedule.

Referring to FIG. 2, the TEF receives a test package with a test plan as an input. The test plan is a TestExecutionSchedule (TES). The TEF creates a hierarchical structure of the TES, which reflects the execution of different parts. I.e. when a part is being executed, an instance (i.e. a runtime object) of a relevant finite state machine (FSM) is created. The instance moves through the states in the FSM, while exchanging messages with its parent and child instances (i.e. with other runtime objects). When the FSM reaches a final state, it is destroyed. FIG. 2 illustrates the FSM for the TestExecutionSchedule, an instance of which is created and executed by the TEF when it receives a test plan.

The TestExecutionSchedule is able to receive four administrative operations: EXECUTE, SUSPEND, RESUME, and ABORT.

EXECUTE is the only operation that can be invoked on a TestExecutionSchedule when it is first created. The TEF starts to execute the test plan when the EXECUTE operation is invoked by an admin on the TestExecutionSchedule. First it goes to the Initializing phase to do any test setup indicated in the TestExecutionSchedule. In the Initializing state, the TEF performs all preparations necessary for the whole TestExecutionSchedule. If successfully completed it moves to the Executing phase. If unsuccessful, it moves to the Failed final state. Once the TestExecutionSchedule moves to the Executing state, the TEF starts invoking TestCases according to the specification of the test plan. The TEF creates the TestCase FSM instances (i.e. runtime objects) as children of the TestExecutionSchedule instance.

The TEF continues the execution until:
all test cases/techniques have been executed successfully and they terminated—then the TEF executes the teardown actions and moves the TestExecutionSchedule instance to the Done final state;
any TSI fails—the TestExecutionSchedule execution failed and moves to the Failed final state.
the execution is suspended by an "error" or by the admin—then the TestExecutionSchedule is moved to Suspended state and can be aborted or resumed.

Within the TestExecutionSchedule TestCases can be specified:
sequentially,
using a CompoundProceduralElement which allows for TestCases to be executed in parallel, or
as alternatives based on specified conditions (like switch blocks in programming).

Just like any UML specified behavior, a TestExecutionSchedule can use any combination of these facilities to model the schedule for the TestCases. The same also applies to the invocations within a TestCase in the TestExecutionSchedule (a.k.a ProcedureInvocations, such as TestProcedure invocations, TestDesignTechnique invocations). Therefore, at any time, one can have either a single TestCase running or multiple TestCases running at the same time. In the TestExecutionSchedule, the partial order is specified through a control flow, which is specified by control flow kind of links among the above constructs. The invocations to be made after the completion of a TestCase are decided based on the construct the test case belongs to and the target(s) of the control flow link(s) that have the completed TestCase as source.

Figure 3:
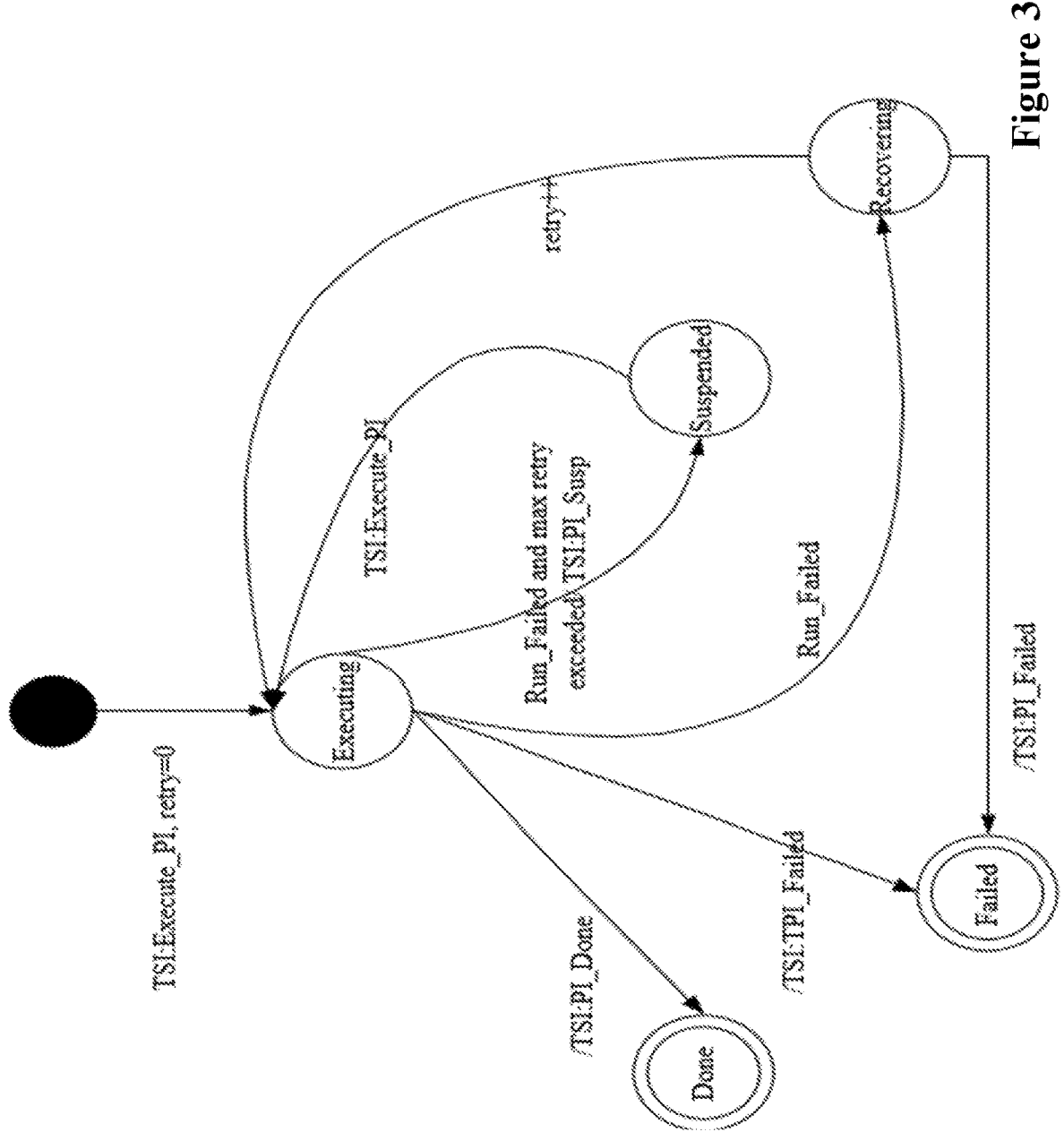
FIG. 3 is a schematic illustration of an execution semantics of a Procedure Invocation and a TestProcedure Invocation.
Figure 4:
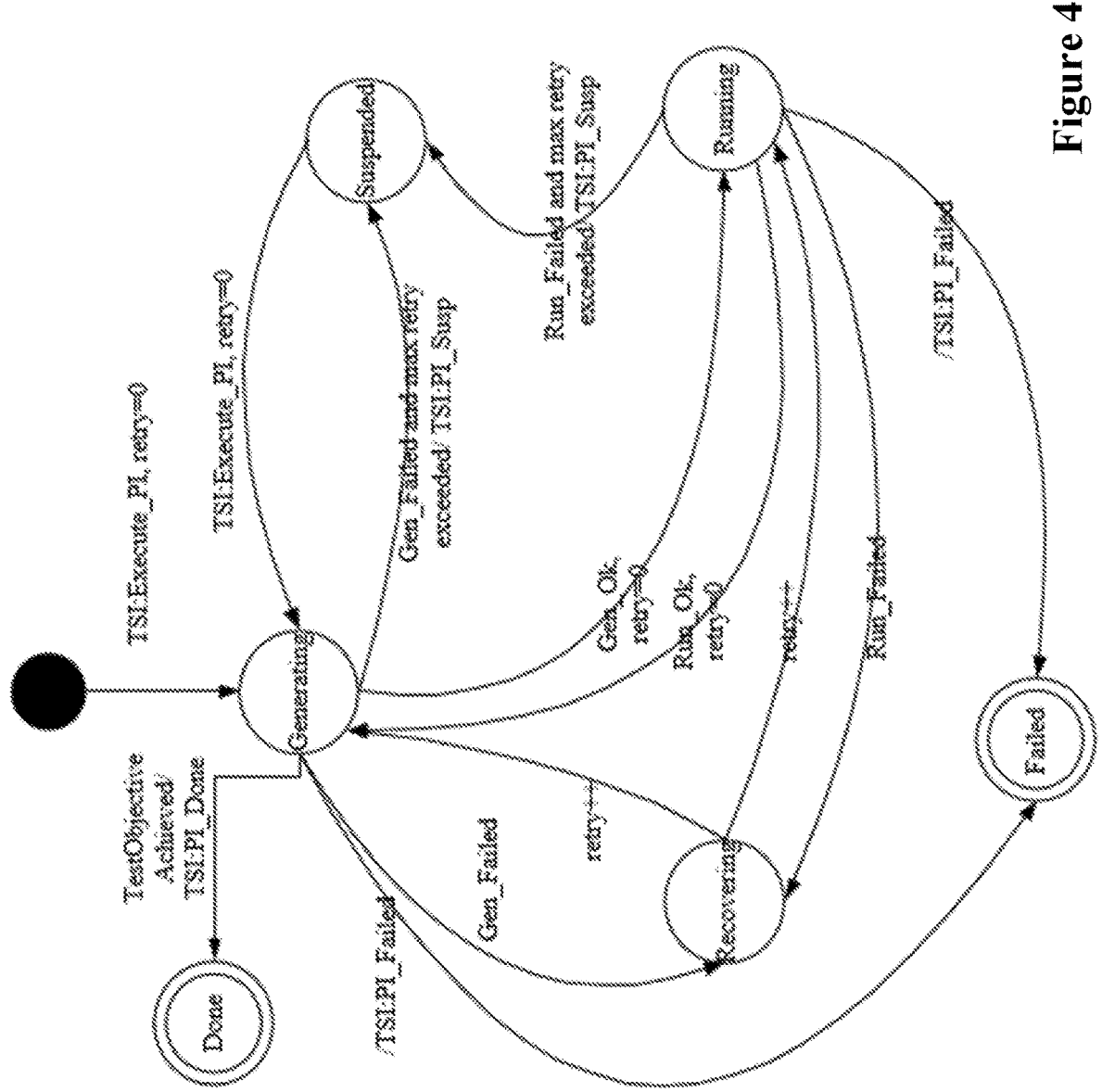
FIG. 4 is a schematic illustration of an execution semantics of a TestDesignTechnique invocation.
Figure 5:
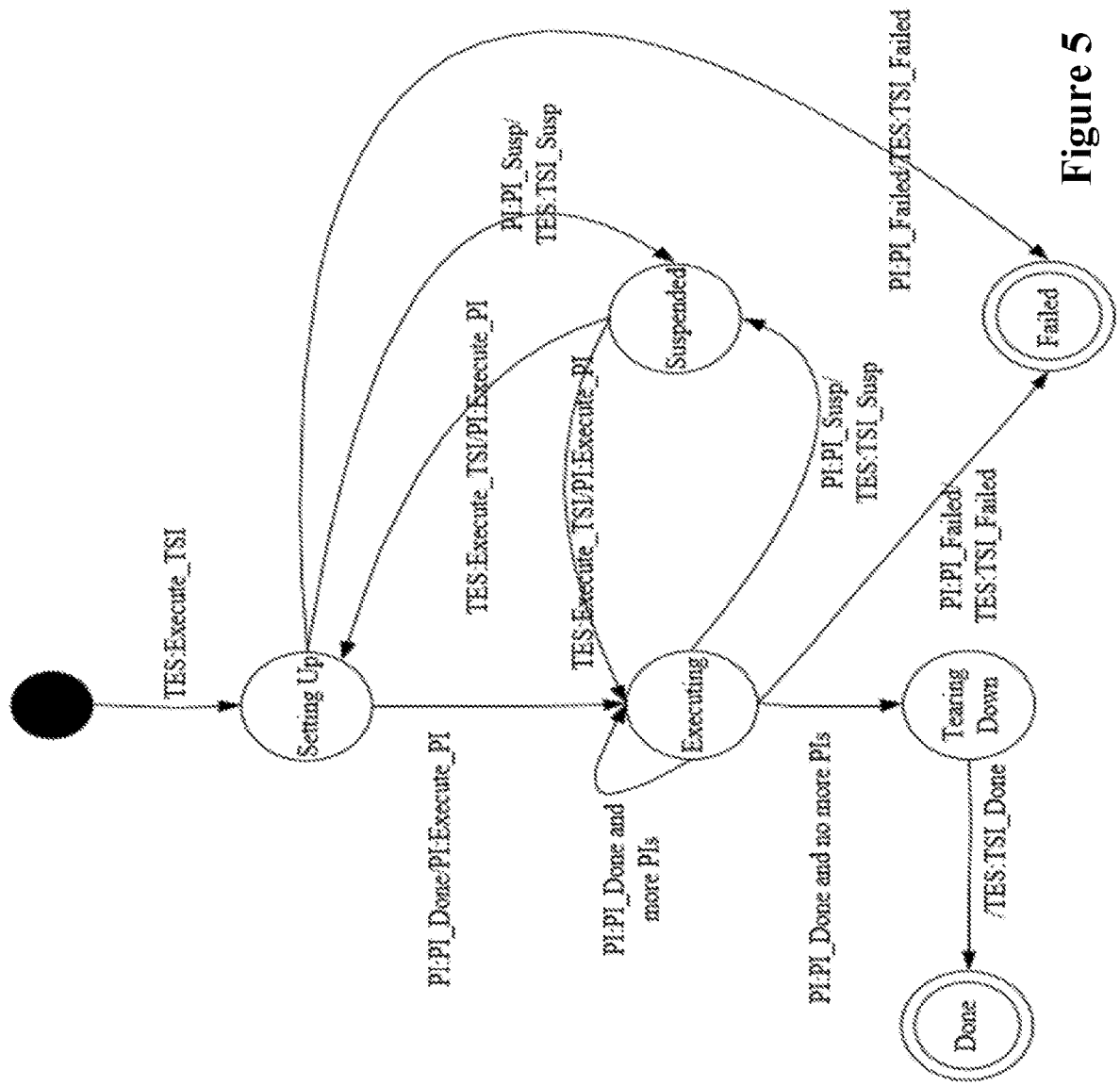
FIG. 5 is a schematic illustration of an execution semantics of a UTP TestCase.

Referring to FIGS. 3 to 5, while the TestExecutionSchedule is in the Executing state, the TEF keeps invoking TestCases using the Execute_TSI message. From the initial Idle state, the invoked TestCase goes to the Executing state (FIG. 5) via a Setting Up state, and completes after a Tearing Down state. As described previously, the TestCases can be executed in parallel or in sequence, so the TestExecutionSchedule runs a number of TestCases each executing according to the state machine of FIG. 5. In all the different states a TestCase invokes different procedures composing the TestCase using the Execute_PI message. According to the TestCase state, these procedure invocations (FIGS. 3 and 4) can be setting up/tearing down a test configuration and/or isolation countermeasures, or running a test case or a test design technique. In the later case, the invocation is for a TestGenerationTechniques with the execution semantics shown in FIG. 4. In the other cases, the procedure invoked follows the execution semantics shown in FIG. 3. This includes the invocation of TestProcedures.

A TestCase starts in the Setting Up state (similar to the TestExecutionSchedule Initializing state) to do the setup required for the TestCase e.g. configuration setup. It can also invoke ProcedureInvocations. Then, when completed, it moves to the Executing state.

The TestCase in the Executing state invokes ProcedureInvocations according to a specified order. A ProcedureInvocation can invoke a TestProcedure or a TestDesignTechnique and accordingly create an instance of the FSM of FIG. 3 or 4 as a child of the TestCase, which will wait for the result of the invocation (similar to the TestExecutionSchedule Executing state). When all ProcedureInvocations have been executed and there is no error or failure, the TestCase moves to the Tear Down state to remove, for example, isolation methods and test configurations. When the tear down completes successfully the TestCase reports to the TestExecutionSchedule the result and the TestCase FSM instance terminates.

If a failure happens with an "error" verdict for a ProcedureInvocation, the TestCase moves to the Failed state, reports the failure to the TestExecutionSchedule and the TestCase FSM terminates.

If a ProcedureInvocation is suspended, generating a customized verdict, the TestCase goes to the Suspended state and reports this to the TestExecutionSchedule. It depends on the decision at the TestExecutionSchedule whether the TestCase is aborted and the FSM is terminated or retried again.

When the execution of a procedure stops, its associated arbitration specification is invoked still in the Executing state. This leads to the creation of the verdict. If the verdict is None, PASS, FAIL, or INCONCLUSIVE, the invocation is deemed as successful (because a verdict about the system under test was created) and the invoked procedure goes to the Done state. If the verdict is a customized verdict, the TEF should be capable of taking recovery actions depending on the received customized verdict, because customized verdicts are produced only if the failure of an action was caused by the failure of a test component (this is a failure of the test component, not the whole system under test). The customized verdict is associated with recovery actions which are tried automatically. The TEF then tries to recover from the failure and reinvoke the failed action. If this retrying exceeds a pre-specified number of times, the procedure goes to the Suspended State. Finally, if the produced verdict is ERROR, the procedure is deemed as failed and goes to the Failed state. This is because it is unknown what went wrong and because of that the testing procedure is considered as failed as opposed to the SUT failing the test (i.e. FAIL verdict). In any case the procedure notifies the TestCase about the result, which then proceeds depending on the procedure's state. If the procedure's state is:
Done: the TestCase proceeds to the next invocation(s);
Suspended: the TestCase goes to the Suspended state, and therefore the TestExecutionSchedule also goes to the SuspendedByError state;
Failed: the TestCase also fails and notifies the TestExecutionSchedule. As a result, the whole test session is deemed as failed.

If the TestExecutionSchedule goes to the Suspending state, the TEF waits for all the currently running TestCases to either complete (Done state), in which case it moves into the Suspended state; or if any TestCase is suspended then the TestExecutionSchedule moves to the SuspendedByError state. Once the TestExecutionSchedule is in the SuspendedByError state, the administrator can either fix/repair the system and resume the test session or abort the test session. If a TestCase that is in Executing state goes to Failed state while the TestExecutionSchedule is in the Suspending or the Executing state, the TestExecutionSchedule goes to the Failed State and the whole test session is deemed as failed.

The SUSPEND administrative operation is used to suspend a test session. Upon the reception of this administrative operation, the TestExecutionSchedule goes to the Suspending state and waits for the result of all currently running TestCases. As described from the Suspending state, the TestExecutionSchedule may go to the Suspended state, to the SuspendedByError state or to the Failed state depending on the results of the currently running TestCases. If in the Suspended and the SuspendedByError states, the administrator can either decide to resume the test session later (possibly after fixing the cause of the suspension by error, i.e. the test component failure) using the RESUME operation or abort the test session using the ABORT operation. In the latter case it is left to the administrator to perform any required teardown or clean-up actions.

Referring again to FIG. 1, the architecture 100 for live testing, comprises a platform independent Test Planner 101 for generating a test package 103 in response to receiving an event 106; and a platform dependent Test Execution Framework (TEF) 102 for executing the test package in an environment serving live traffic.

Generating the test package may comprise selecting test goals corresponding to the event; generating a test suite comprising test cases and test design techniques selected to achieve the test goals; and generating a test plan comprising partially ordered Test Suite Item runs (TSIs), wherein each TSI combines a test configuration with at least one test suite item.

Generating the test package may further comprise updating a test repository using information collected about each executed test case. This is done for the future test package generation.

Generating the test suite may be based on a runtime state of a system to be tested and information about the selected test cases and about the selected test design techniques may be complemented with appropriate test isolation methods and contingency plans to minimize any impact on live traffic.

The test cases and test design techniques may be stored in a test repository, the test repository comprises information including mappings between the test goals, the test cases and the test design techniques.

The event may comprise any one of: a periodic event, a system reconfiguration or change, an addition of a new test goal to the test repository, and a test request; and the test request may comprise any one of: an aggregation of periodic events, a set of test goals to achieve, a set of fault-revealing test goals, or a set of test cases.

Unified Modeling Language (UML) Testing Profile (UTP) may be used as a modeling tool for at least the test goals, the test cases, the test design techniques, the test suite and the test plan.

The test plan may be expressed as a TestExecutionSchedule that runs at least one UTP TestCase; and a UTP TestCase may consist of one or more test cases or test design techniques provided by a vendor or a developer.

The test goals that are associated with test cases may be modeled as UTP TestRequirement and the test goals that are associated with test design techniques may be modeled as UTP TestObjective.

Failures may be detected during execution of the test package as UTP verdict types. The UTP verdict types may comprise: UTP verdicts None, PASS, FAIL, or INCONCLUSIVE which are deemed as successful test execution; UTP verdict ERROR corresponds to a test execution failure of undetermined origin; and UTP customized verdicts corresponds to identified test execution failures.

Executing a test package on a live system serving live traffic may comprise running the test suite items according to the test plan comprising the partially ordered TSIs, each TSI may combine a test configuration with at least one test suite item.

Executing the test package on a live system serving live traffic may comprise initializing a test plan; starting the test plan, the test plan starting Test Suite Item runs (TSIs) of a test suite according to a provided ordering, the test plan being able to invoke one or more TSIs, for sequential or parallel execution; upon successful completion of all TSIs, tearing down the test plan and reporting the successful completion of the test plan; upon suspension of a TSI, reporting the suspension of the TSI and waiting for further instructions; and upon failure of a TSI with an ERROR verdict, reporting a failure of the test plan and executing a corresponding contingency plan.

Figure 6A:
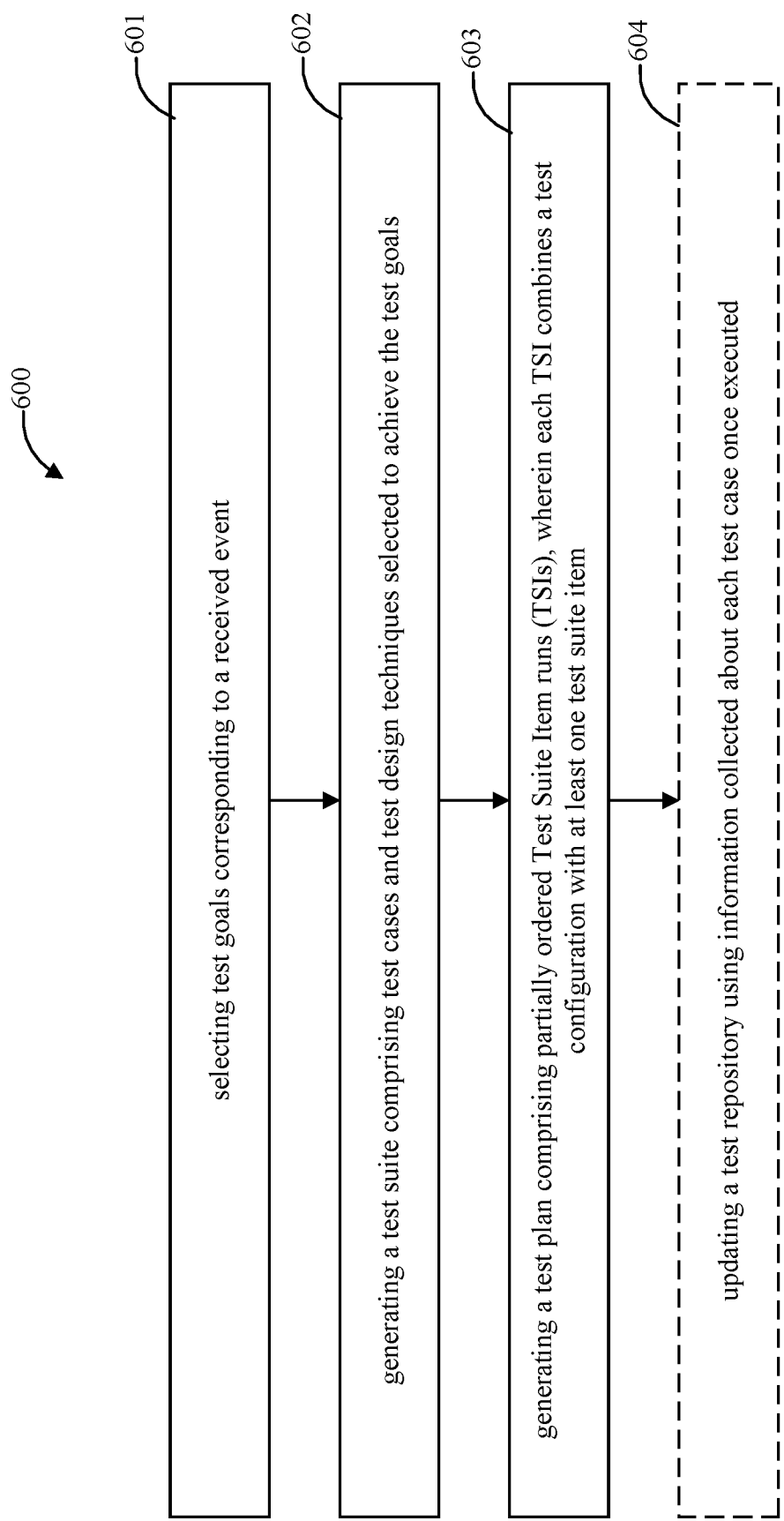
FIG. 6a is a flowchart of a method for generating a test package for live testing.

FIG. 6a illustrates a method 600 for generating a test package for live testing, comprising selecting, step 601, test goals corresponding to a received event; generating, step 602, a test suite comprising test cases and test design techniques selected to achieve the test goals; and generating, step 603, a test plan comprising partially ordered Test Suite Item runs (TSIs), wherein each TSI combines a test configuration with at least one test suite item.

In the method, generating the test suite may be based on a runtime state of a system to be tested and information about the selected test cases and about the selected test design techniques may be complemented with appropriate test isolation methods and contingency plans to minimize any impact on live traffic.

The test cases and test design techniques may be stored in a test repository, the test repository comprising information including mappings between the test goals, the test cases and the test design techniques.

The event may comprise any one of: a periodic event, a system reconfiguration or change, an addition of a new test goal to the test repository, and a test request; and the test request may comprise any one of: an aggregation of periodic events, a set of test goals to achieve, a set of fault-revealing test goals, or a set of test cases.

The Unified Modeling Language (UML) Testing Profile (UTP) may be used as a modeling tool for at least the test goals, the test cases, the test design techniques, the test suite and the test plan.

The test plan may be expressed as a TestExecutionSchedule that runs at least one UTP TestCase; and a UTP TestCase may consist of one or more test cases or test design techniques provided by a vendor or a developer.

The test goals that are associated with test cases may be modeled as UTP TestRequirement and the test goals that are associated with test design techniques may be modeled as UTP TestObjective.

Failures may be detected during execution of the test package as UTP verdict types. The UTP verdict types may comprise: UTP verdicts None, PASS, FAIL, or INCON- CLUSIVE which are deemed as successful test execution; UTP verdict ERROR corresponding to a test execution failure of undetermined origin; and UTP customized verdicts corresponding to identified test execution failures.

Executing a test package on a live system serving live traffic may comprise running the test suite items according to the test plan comprising the partially ordered TSIs, each TSI may combine a test configuration with at least one test suite item.

The method may further comprise updating, step 604, a test repository using information collected about each test case once executed.

Figure 6B:
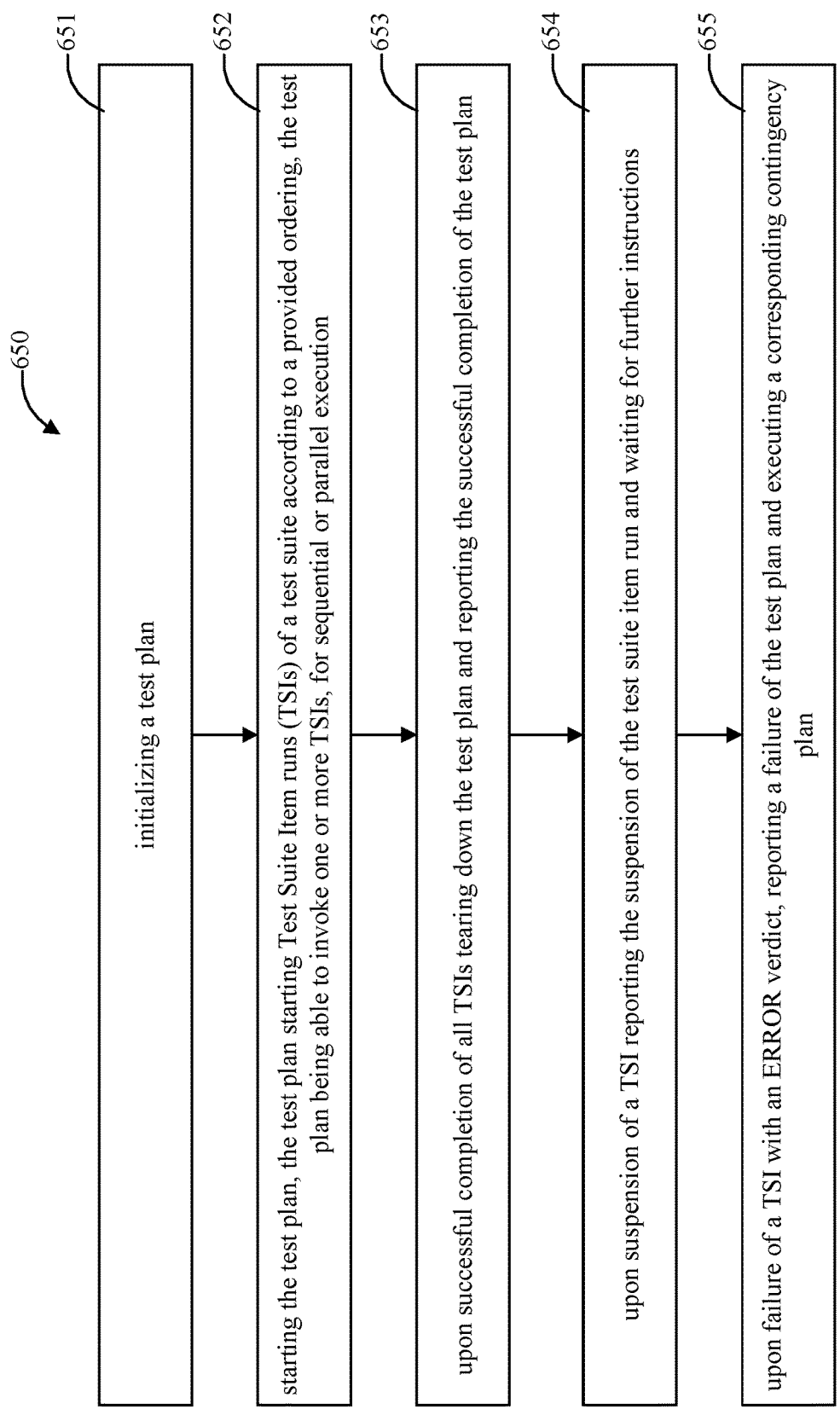
FIG. 6b is a flowchart of a method for executing the test package on a live system serving live traffic for live testing.

FIG. 6*b* illustrates a method 650 for executing the test package on live system serving live traffic for live testing, comprising: initializing, step 651, a test plan; starting, step 652, the test plan, the test plan starting Test Suite Item runs (TSIs) of a test suite according to a provided ordering, the test plan being able to invoke one or more TSIs, for sequential or parallel execution; upon successful completion of all TSIs tearing down, step 653, the test plan and reporting the successful completion of the test plan; upon suspension of a TSI reporting, step 654, the suspension of the test suite item run and waiting for further instructions; and upon failure of a TSI with an ERROR verdict, reporting, step 655, a failure of the test plan and executing a corresponding contingency plan.

Figure 7:
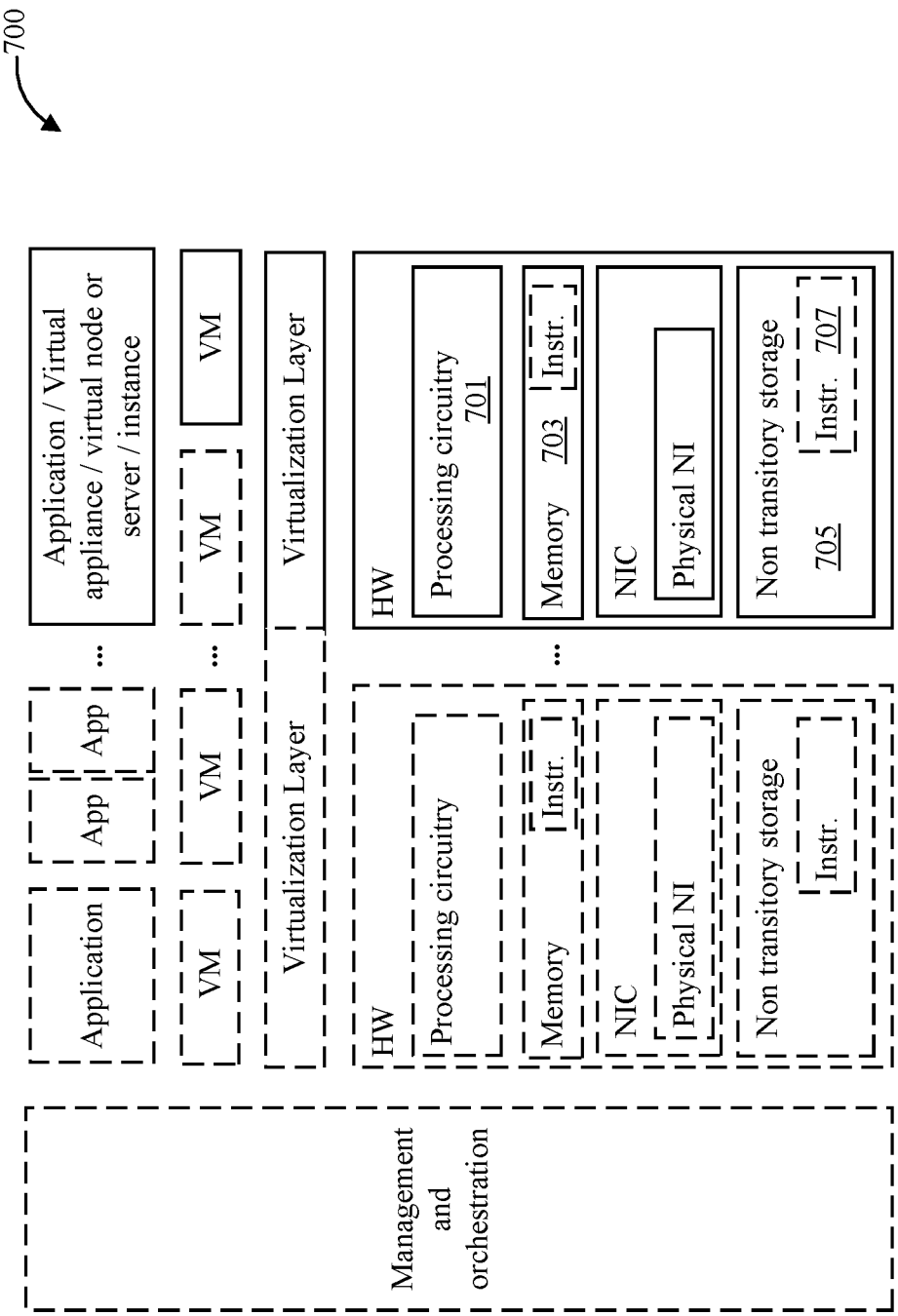
FIG. 7 is a schematic illustration of a virtualization environment in which the architecture, methods, system and non-transitory computer readable media described herein can be deployed.

Referring to FIG. 7, there is provided a virtualization environment 700 in which functions and steps described herein can be implemented.

A virtualization environment (which may go beyond what is illustrated in FIG. 7), may comprise systems, networks, servers, nodes, devices, etc., that are in communication with each other either through wire or wirelessly. Some or all of the functions and steps described herein may be implemented as one or more virtual components (e.g., via one or more applications, components, functions, virtual machines or containers, etc.) executing on one or more physical apparatus in one or more networks, systems, environment, etc.

A virtualization environment provides hardware comprising processing circuitry 701 and memory 703. The memory can contain instructions executable by the processing circuitry whereby functions and steps described herein may be executed to provide any of the relevant features and benefits disclosed herein.

The hardware may also include non-transitory, persistent, machine readable storage media 705 having stored therein software and/or instruction 707 executable by processing circuitry to execute functions and steps described herein.

A system may be deployed in the virtual environment of FIG. 7 in which live testing is executed. The system comprises processing circuits or processing circuitry 701 and a memory 703, the memory containing instructions executable by the processing circuits whereby the system is operative to generate a test package in response to receiving an event; and execute the test package in an environment serving live traffic. The system is operative to execute any of the steps described herein.

The virtual environment of FIG. 7 also provides a non-transitory computer readable media 705 having stored thereon instructions for live testing in a production environment, the instructions comprising any of the steps described herein.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. Although specific terms may be employed herein, they are used in a generic and descriptive sense only and not for purposes of limitation.

The invention claimed is:

1. An architecture for live testing, comprising:
a platform independent Test Planner for generating a test package in response to receiving an event, wherein generating the test package comprises:
selecting test goals corresponding to the event;
generating a test suite comprising test cases and test design techniques selected to achieve the test goals; and
generating a test plan comprising partially ordered Test Suite Item runs (TSIs), wherein each TSI combines a test configuration with at least one test suite item;
wherein Unified Modeling Language (UML) Testing Profile (UTP) is used as a modeling tool for at least the test goals, the test cases, the test design techniques, the test suite and the test plan; and
wherein the test goals that are associated with test cases are modeled as UTP TestRequirement and the test goals that are associated with test design techniques are modeled as UTP TestObjective; and
a platform dependent Test Execution Framework (TEF) for executing the test package in an environment serving live traffic;
wherein, during execution of the test package, the TEF creates a hierarchical structure of the test plan, creates an instance of a finite state machine (FSM), wherein the instance of the FSM moves through states in the FSM while exchanging messages with parent and child instances, and destroys the FSM when a final state is reached.

2. The architecture of claim 1, further comprising updating a test repository using information collected about each executed test case.

3. The architecture of claim 1, wherein generating the test suite is based on a runtime state of a system to be tested and wherein information about the selected test cases and about the selected test design techniques is complemented with appropriate test isolation methods and contingency plans to minimize any impact on live traffic.

4. The architecture of claim 3, wherein the test cases and test design techniques are stored in a test repository, the test repository comprising information including mappings between the test goals, the test cases and the test design techniques.

5. The architecture of claim 1, wherein the event comprises any one of: a periodic event, a system reconfiguration or change, an addition of a new test goal to a test repository, and a test request; and wherein the test request comprises any one of: an aggregation of periodic events, a set of test goals to achieve, a set of fault-revealing test goals, or a set of test cases.

6. The architecture of claim 1, wherein the test plan is expressed as a TestExecutionSchedule that runs at least one UTP TestCase; and wherein a UTP TestCase consists of one or more test cases or test design techniques provided by a vendor or a developer.

7. The architecture of claim 1, wherein failures are detected during execution of the test package as UTP verdict types.

8. The architecture of claim 7, wherein the UTP verdict types comprise:

UTP verdicts None, PASS, FAIL, or INCONCLUSIVE which are deemed as successful test execution;

UTP verdict ERROR corresponding to a test execution failure of undetermined origin; and UTP customized verdicts corresponding to identified test execution failures.

9. The architecture of claim 1, wherein executing a test package on a live system serving live traffic comprises running the test suite items according to the test plan comprising the partially ordered TSIs, wherein each TSI combines a test configuration with at least one test suite item.

10. The architecture of claim 1, wherein executing the test package on a live system serving live traffic comprises:

initializing a test plan;

starting the test plan, the test plan starting Test Suite Item runs (TSIs) of a test suite according to a provided ordering, the test plan being able to invoke one or more TSIs, for sequential or parallel execution;

upon successful completion of all TSIs, tearing down the test plan and reporting the successful completion of the test plan;

upon suspension of a TSI, reporting the suspension of the TSI and waiting for further instructions; and upon failure of a TSI with an ERROR verdict, reporting a failure of the test plan and executing a corresponding contingency plan.

* * * * *